United States Patent
Gilley

(10) Patent No.: US 10,309,289 B2
(45) Date of Patent: Jun. 4, 2019

(54) HEAT STORAGE SYSTEM

(71) Applicant: DENSO International America, Inc., Southfield, MI (US)

(72) Inventor: Adam Gilley, Detroit, MI (US)

(73) Assignee: DENSO International America, Inc., Southfield, MI (US)

( * ) Notice: Subject to any disclaimer, the term of this patent is extended or adjusted under 35 U.S.C. 154(b) by 76 days.

(21) Appl. No.: 15/611,078

(22) Filed: Jun. 1, 2017

(65) Prior Publication Data
US 2018/0347444 A1 Dec. 6, 2018

(51) Int. Cl.
*F01P 11/10* (2006.01)
*F01P 3/20* (2006.01)
*B60K 11/02* (2006.01)
*F01P 7/16* (2006.01)
*F01P 7/14* (2006.01)

(52) U.S. Cl.
CPC ............... *F01P 3/20* (2013.01); *B60K 11/02* (2013.01); *F01P 7/16* (2013.01); *F01P 2007/146* (2013.01); *F01P 2037/02* (2013.01); *F01P 2060/08* (2013.01)

(58) Field of Classification Search
CPC ............. F01P 2011/205; F01P 2060/08; F01P 2007/146; F01P 2037/02; F01P 7/026; F01P 7/165; B60H 1/00492; B60H 1/00314; B60H 1/00271; F28D 20/0034; F28D 20/021; Y02E 60/145; F02N 19/10; F28F 21/062
See application file for complete search history.

(56) References Cited

U.S. PATENT DOCUMENTS

| | | | | |
|---|---|---|---|---|
| 4,251,997 A | * | 2/1981 | Newton | F25B 15/00 62/101 |
| 5,765,511 A | * | 6/1998 | Schatz | B60H 1/00492 123/41.14 |
| 6,178,929 B1 | * | 1/2001 | Schatz | B60H 1/00492 123/142.5 R |
| 2003/0200948 A1 | * | 10/2003 | Ban | B60H 1/00492 123/142.5 R |
| 2009/0194250 A1 | * | 8/2009 | Kudo | F24H 7/04 165/10 |
| 2009/0205590 A1 | * | 8/2009 | Vetrovec | F01P 11/20 123/41.14 |
| 2010/0186924 A1 | * | 7/2010 | Hiyama | F01P 7/165 165/10 |

(Continued)

FOREIGN PATENT DOCUMENTS

| | | |
|---|---|---|
| JP | H05202749 A | 8/1993 |
| JP | H06017648 A | 1/1994 |
| WO | WO-16146851 A1 | 9/2016 |

*Primary Examiner* — Marguerite J McMahon
*Assistant Examiner* — Teuta B Holbrook
(74) *Attorney, Agent, or Firm* — Harness, Dickey & Pierce, P.L.C.

(57) ABSTRACT

A heat storage system including a heat storage device that stores heat and transfers heat to engine coolant passing through the heat storage device. A coolant flow control system directs coolant through the heat storage system. A control module configures the coolant flow control system to direct coolant to bypass the heat storage device such that the heat storage device does not heat the coolant when temperature of the engine is above the predetermined temperature.

18 Claims, 2 Drawing Sheets

(56) References Cited

U.S. PATENT DOCUMENTS

| | | | |
|---|---|---|---|
| 2012/0168111 A1* | 7/2012 | Soukhojak | F28D 15/043 165/10 |
| 2012/0198821 A1* | 8/2012 | Soukhojak | F01N 3/2006 60/274 |
| 2013/0146000 A1* | 6/2013 | Choi | F01P 11/00 123/41.14 |
| 2015/0136048 A1* | 5/2015 | Sundemo | F01P 7/16 123/41.1 |

* cited by examiner

HEAT STORAGE SYSTEM

FIELD

The present disclosure relates to a heat storage system, such as a heat storage system for a vehicle engine and vehicle heater core.

BACKGROUND

This section provides background information related to the present disclosure, which is not necessarily prior art.

Some vehicles are equipped with heat storage systems, which store heat that is later used to heat engine coolant during engine start. The stored heat advantageously reduces the time that it takes for an engine to reach its optimal operating temperature at engine start. It is desirable to bring an engine to its optimal operating temperature as quickly as possible to, for example, reduce engine emissions and improve fuel efficiency. While current heat storage systems are suitable for their intended use, they are subject to improvement. For example, a heat storage system with improved efficiencies would be desirable. The present teachings advantageously provide for a heat storage system that is more efficient than, and has additional applications as compared to, current heat storage systems.

SUMMARY

This section provides a general summary of the disclosure, and is not a comprehensive disclosure of its full scope or all of its features.

The present teachings provide for a heat storage system including a heat storage device that stores heat and transfers heat to engine coolant passing through the heat storage device. A coolant flow control system directs coolant through the heat storage system. A control module configures the coolant flow control system to direct coolant to bypass the heat storage device such that the heat storage device does not heat the coolant when temperature of the engine is above the predetermined temperature, and/or a heat storage medium of the heat storage device has reached a predetermined target temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
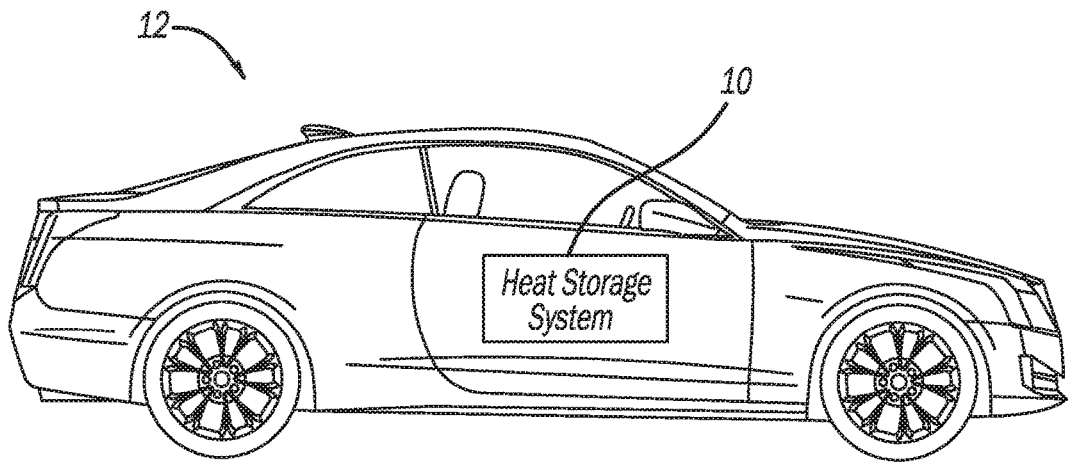
FIG. 1 illustrates an exemplary vehicle including a heat storage system in accordance with the present teachings.

FIG. 1 illustrates a heat storage system 10 in accordance with the present teachings installed in an exemplary vehicle 12. Although the vehicle 12 is illustrated as a passenger vehicle, the heat storage system 10 can be used with any other suitable vehicle, such as any suitable utility vehicle, mass transit vehicle, construction vehicle, military vehicle, watercraft, aircraft, etc. The heat storage system 10 can also be used with any suitable non-vehicular application. For example, the heat storage system 10 can be used with any suitable building system, such as any suitable building HVAC generator system, or any other suitable system, including an engine for which rapid warm up of the engine is desired.

The heat storage system 10 advantageously facilitates warm up of engine 14, particularly by warming engine coolant flowing through the engine 14. The engine 14 can be any suitable engine, such as any suitable internal combustion engine. The engine 14 may be the sole power plant of the vehicle 12 or may be included with a hybrid system, such as a hybrid electric vehicle system.

Figure 2:
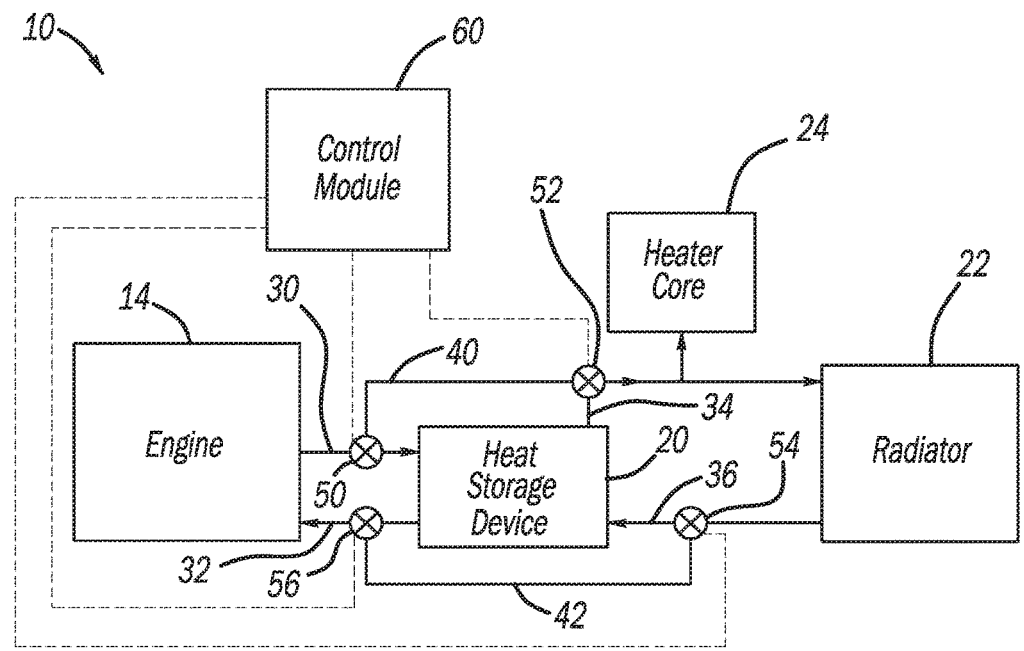
FIG. 2 illustrates a heat storage system in accordance with the present teachings.
Figure 3A:
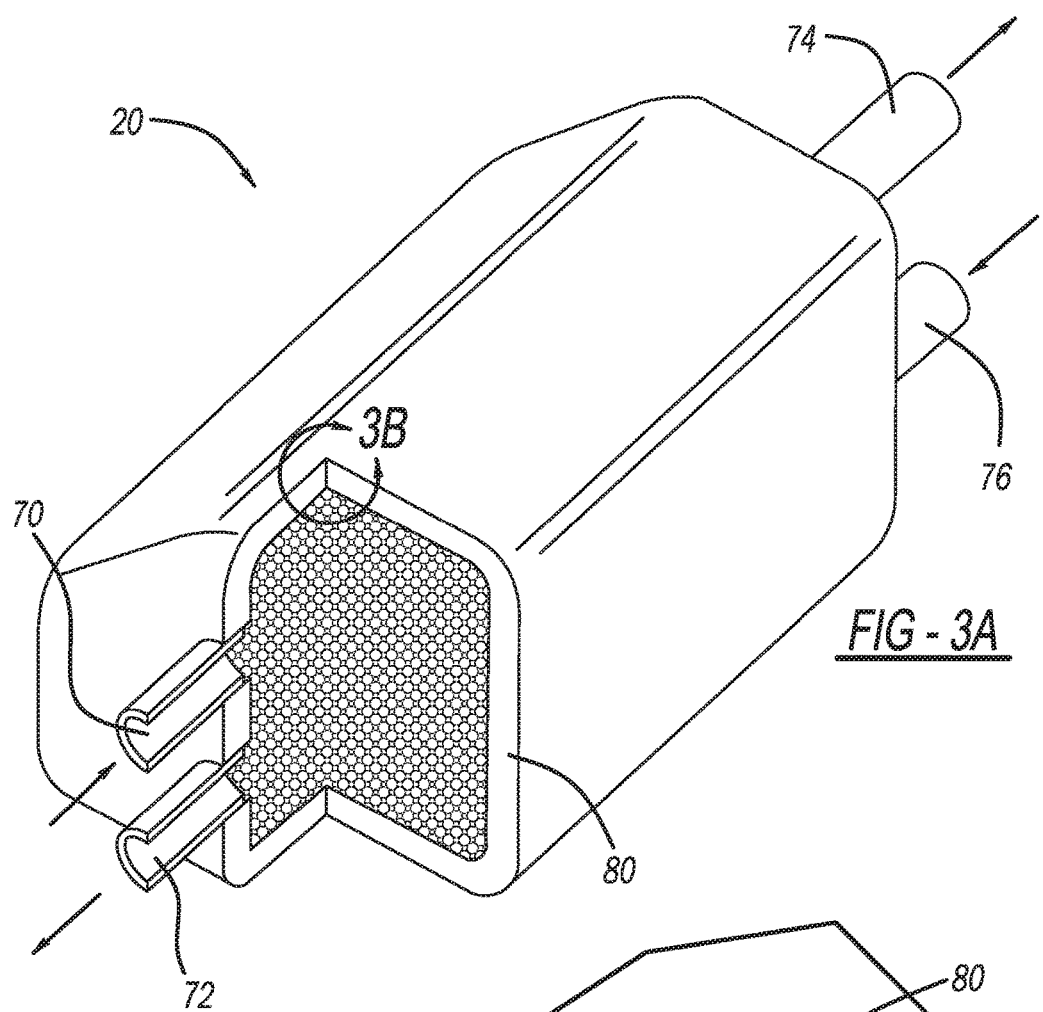
FIG. 3A is a perspective view of a heat storage device in accordance with the present teachings.
Figure 3B:
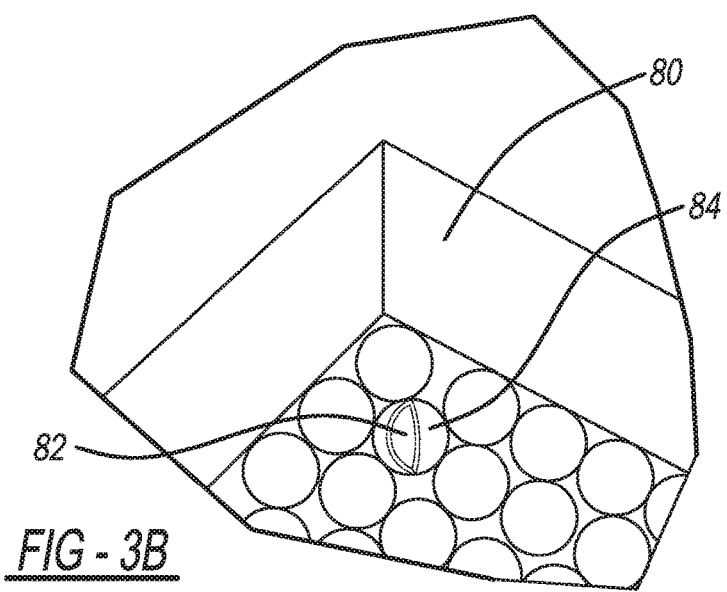
FIG. 3B illustrates area 3B of FIG. 3A.

FIG. 2 illustrates additional details of the heat storage system 10. The heat storage system 10 includes a heat storage device 20. The heat storage device 20 is any suitable device configured to store heat that can be used to warm engine coolant. An exemplary heat storage device 20 is illustrated in FIGS. 3A and 3B, and will be described in detail below.

The heat storage system 10 further includes a heater core 24 for warming a passenger cabin of the vehicle 12. In non-vehicular applications, the heater core 24 can be any suitable heater for heating any suitable desired area. The heat storage device 20 is connected to a radiator 22. The radiator 22 can be any suitable heat exchanger for transferring thermal energy. The radiator 22 transfers heat out of the engine coolant system.

The engine 14, heat storage device 20, radiator 22, and heater core 24 are connected by a coolant flow control system. The coolant flow control system includes an engine outlet coolant flow path 30, which connects the engine 14 directly to the heat storage device 20. An engine inlet coolant flow path 32 connects the heat storage device 20 directly to the engine 14 to direct coolant from the heat storage device 20 directly to the engine 14. A heat storage device outlet coolant flow path 34 connects the heat storage device 20 directly to the radiator 22 to direct coolant from the heat storage device 20 to the radiator 22. A heat storage device inlet coolant flow path 36 connects the radiator 22 directly to the heat storage device 20 to direct coolant from the radiator 22 directly to the heat storage device 20. The heater core 24 is arranged along the heat storage device outlet coolant flow path 34 (such as on heater core coolant flow path 44) upstream of the radiator 22 in order to receive coolant from either the heat storage device 20 or directly from the engine 14. The heater core 24 may also receive coolant simultaneously from both the engine 14 and the heat storage device 20.

A first heat storage device bypass coolant flow path 40 connects the engine 14 directly to the radiator 22 to direct coolant from the engine 14 to the radiator 22 directly without coolant passing to the heat storage device 20. The first heat storage device bypass coolant flow path 40 can extend from the flow path 30 to the flow path 34. A second heat storage device bypass coolant flow path 42 connects the radiator 22 directly to the engine 14 to direct coolant from the radiator 22 to the engine 14 without coolant passing to the heat storage device 20. The second heat storage device bypass coolant flow path 42 can extend from the flow path 36 to the flow path 32, for example. The flow paths 30, 32, 34, 36, 40 and 42 can be provided in any suitable manner, such as by any suitable tubes or other conduits.

The coolant flow control system includes a plurality of flow control devices, such as valves, to selectively direct coolant through the different flow paths 30, 32, 34, 36, 40 and 42. For example, valve 50 is arranged between the engine 14 and the heat storage device 20 to selectively direct coolant from the engine 14 to either the heat storage device 20 by way of the engine outlet coolant flow path 30, or through the first heat storage device bypass coolant flow path 40. Valve 50 is at an intersection between the path 30 and the bypass path 40. Valve 52 is at an intersection between the heat storage device outlet coolant flow path 34 and the first heat storage device bypass coolant flow path 40. The valves 50 and 52 can be set by the control module 60 to direct coolant to the heater core 24 directly from the heat storage device 20 through the flow path 34 and directly from the engine 14 through bypass path 40 simultaneously, or from only one of the flow path 34 or the bypass path 40.

Valve 54 is arranged along the heat storage device inlet coolant flow path 36 between the radiator 22 and the heat storage device 20. Specifically, the valve 54 is at an intersection between the flow path 36 and the second heat storage device bypass coolant flow path 42. Valve 56 is arranged between the heat storage device 20 and the engine 14 along the engine inlet coolant flow path 32, at an intersection between the flow path 32 and the second heat storage device bypass coolant flow path 42.

The control module 60 can be any suitable device or system configured to control actuation of the valves 50, 52, 54, and 56. The control module 60 receives input from temperature sensors measuring temperature of the engine 14 and temperature of the heat storage device 20, and actuates the valves 50, 52, 54, and 56 based on the temperature readings, as explained herein. In this application, including the definitions below, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

FIGS. 3A and 3B illustrate additional details of the heat storage device 20. The heat storage device 20 includes an inlet 70 for receipt of coolant flowing to the heat storage device 20 from the engine outlet coolant flow path 30. The heat storage device 20 also includes an outlet 72, through which coolant flows out from the heat storage device 20 to the engine 14 through the engine inlet coolant flow path 32. Outlet 74 of the heat storage device 20 is connected to heat storage device outlet coolant flow path 34. Inlet 76 is connected to the heat storage device inlet coolant flow path 36.

The heat storage device 20 includes an insulation container 80. Housed within the insulation container 80 are any suitable latent heat storage materials 82. An exemplary latent heat storage material 82 is paraffin. The latent heat storage materials 82 are encased within any suitable outer shell 84. The outer shell 84 can be an acrylic outer shell.

When the engine 14 is started, particularly during a cold engine start, the control module 60 configures the valves 54 and 56 such that coolant flowing to the engine 14 flows through the heat storage device 20 in order to be heated by the heat storage device 20. The warmed coolant will then flow to the engine 14 to warm the engine 14 and bring the engine 14 to its optimal operating temperature more quickly. The control module 60 configures valves 50 and 52 such that coolant flowing from the engine 14 passes through the heat storage device 20 in order to further heat the coolant prior to the coolant passing to the heater core 24, which heats the passenger cabin. When the engine 14 is warm enough, the heated coolant flowing from the engine 14 to the heat storage device 20 will reheat the heat storage device 20 to provide the heat storage device 20 with sufficient heat to heat coolant during a subsequent engine start.

Once the control module 60 detects that the engine 14 has reached its optimal operating temperature, and that the heat storage device 20 is sufficiently reheated by warm coolant flowing from the engine 14, the control module 60 will reconfigure the valves 50, 52, 54, and 56 so that coolant no longer flows through the heat storage device 20. Specifically, the control module 60 will configure the valves 50 and 52 so that warm coolant flowing from engine 14 flows through the first heat storage device bypass coolant flow path 40, which will direct coolant from the engine 14 to the heater core 24 and the radiator 22 without the coolant flowing through the heat storage device 20. The control module 60 will also configure the valves 54 and 56 so that coolant flowing from the radiator 22 will flow through the second heat storage device bypass coolant flow path 42, which will direct coolant from the radiator 22 to the engine 14 without the coolant passing through the heat storage device 20.

The present teachings provide numerous advantages. For example, by directing coolant through the bypass coolant flow paths 40 and 42 after the engine 14 has reached its optimal operating temperature and the heat storage device 20 has been sufficiently reheated after transferring heat stored therein to coolant flowing to the engine 14, the heat storage system 10 can be made more efficient because coolant will not continue to unnecessarily flow through the heat storage device 20. The present teachings also advantageously provide for quicker warm-up of the heater core 24 by providing two coolant flow paths to the heater core 24. Specifically, coolant to the heater core 24 is heated by the heat storage device 20 until the engine 14 reaches its optimal operating temperature, at which point the control module 60 configures the valves 50 and 52 to direct coolant to the heater core 24 directly from the warm engine 14. Furthermore, the heat storage device 20 is advantageously reheated by coolant flowing directly from the engine 14 through the coolant flow path 30, thereby reheating the heat storage device 20 more quickly because the coolant flowing to the heat storage device 20 is at its highest possible temperature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heat storage system comprising:
   a heat storage device that stores heat and transfers heat to engine coolant passing through the heat storage device;
   a heater core for heating a vehicle passenger cabin, the heater core is downstream of an engine and branches off from a direct connection line that is between the engine and a radiator, the direct connection line bypasses the heat storage device;
   a coolant flow control system, including the direct connection line, that directs coolant through the heat storage system, the heater core, the radiator, and the engine; and
   a control module that:
      configures the coolant flow control system to direct coolant to the heat storage device so the heat storage device heats the coolant, and direct the heated coolant to an engine to warm the engine when temperature of the engine is below a predetermined temperature;
      configures the coolant flow control system to direct coolant to bypass the heat storage device such that the heat storage device does not heat the coolant when temperature of the engine is above the predetermined temperature; and
      configures the coolant flow control system to direct coolant to the heater core from the heat storage device to heat the heater core.

2. The heat storage system of claim 1, wherein the control module configures the coolant flow control system to direct coolant to the heater core simultaneously from both the heat storage device and the engine.

3. The heat storage system of claim 1, wherein the control module configures the coolant flow control system to direct coolant to the heat storage device directly from the engine to heat the heat storage device.

4. The heat storage system of claim 1, wherein the coolant flow control system includes a plurality of valves controllable by the control module.

5. The heat storage system of claim 1, wherein the heat storage device includes a latent heat storage material encased within an outer shell, the latent heat storage material is configured to store heat.

6. The heat storage system of claim 5, wherein the latent heat storage material includes paraffin.

7. The heat storage system of claim 6, wherein the outer shell includes acrylic.

8. The heat storage system of claim 1, wherein the control module configures the coolant flow control system to direct coolant from the engine directly to the heater core such that the coolant bypasses the heat storage device after the heat storage device has reached a predetermined temperature.

9. A heat storage system comprising:
   a heat storage device that stores heat and transfers heat to engine coolant passing through the heat storage device;
   a heater core;

a radiator; and a coolant flow control system that directs coolant through the storage system, the coolant flow control system including a heat storage device bypass coolant flow path extending from an engine outlet coolant flow path that connects the engine directly to the heat storage device, both the heater core and the radiator are arranged along the heat storage device bypass coolant flow path;

a control module that:

configures the coolant flow control system to direct coolant across the heat storage device so the heat storage device heats the coolant, and direct the heated coolant to the engine to warm the engine when temperature of the engine is below a predetermined temperature;

configures the coolant flow control system to direct coolant to flow from the radiator directly to the engine so that the coolant bypasses the heat storage device when temperature of the engine is above the predetermined temperature; and configures the coolant flow control system to direct coolant from the engine to the heat storage device directly to heat the heat storage device without the coolant passing through the radiator prior to reaching the heat storage device.

10. The heat storage system of claim 9, wherein the control module configures the coolant flow control system to direct coolant to the heater core directly from the heat storage device when the coolant is below a target temperature for cabin heating.

11. The heat storage system of claim 9, wherein when the heat storage device has reached a predetermined temperature, the control module configures the coolant flow control system to direct coolant from the engine to bypass the heat storage device such that coolant flowing from the engine flows to the radiator without flowing through the heat storage device.

12. The heat storage system of claim 9, wherein the coolant flow control system includes a plurality of valves controllable by the control module.

13. The heat storage system of claim 9, wherein the heat storage device includes a latent heat storage material encased within an outer shell, the latent heat storage material is configured to store heat.

14. The heat storage system of claim 13, wherein the latent heat storage material includes paraffin.

15. The heat storage system of claim 14, wherein the outer shell includes acrylic.

16. A heat storage system comprising:

a heat storage device that stores heat and transfers heat to, or absorbs heat from, engine coolant passing through the heat storage device;

a radiator; and a coolant flow control system including:

an engine outlet coolant flow path connecting an engine directly to the heat storage device to direct coolant from the engine directly to the heat storage device;

an engine inlet coolant flow path connecting the heat storage device directly to the engine to direct coolant from the heat storage device directly to the engine;

a heat storage device outlet coolant flow path connecting the heat storage device directly to the radiator to direct coolant from the heat storage device to the radiator;

a heat storage device inlet coolant flow path connecting the radiator directly to the heat storage device to direct coolant from the radiator directly to the heat storage device without flowing through the engine;

a first heat storage device bypass coolant flow path connecting the engine directly to the radiator to direct coolant from the engine to the radiator directly without coolant passing to the heat storage device; and a second heat storage device bypass coolant flow path connecting the radiator directly to the engine to direct coolant from the radiator to the engine without coolant passing to the heat storage device.

17. The heat storage system of claim 16, further comprising:

a heater core; and a heater core coolant flow path that directs coolant to the heater core from at least one of the heater storage device and the engine.

18. The heat storage system of claim 16, wherein the coolant flow control system includes a plurality of valves controlled by a control module, the plurality of valves direct coolant flow through the heat storage system.

* * * * *